United States Patent
Yotsuya (10) Patent No.: US 8,467,127 B2
(45) Date of Patent: Jun. 18, 2013

(54) SCREEN AND METHOD FOR PRODUCING FORMING MOLD

(75) Inventor: Shinichi Yotsuya, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/420,187

(22) Filed: Mar. 14, 2012

(65) Prior Publication Data

US 2012/0236401 A1    Sep. 20, 2012

(30) Foreign Application Priority Data

Mar. 16, 2011  (JP) ................... 2011-058313

(51) Int. Cl.
*G03B 21/60* (2006.01)
(52) U.S. Cl.
USPC .......................................... 359/459; 359/443
(58) Field of Classification Search
CPC ....................................................... G03B 21/60
USPC .................................................. 359/443, 459
See application file for complete search history.

(56) References Cited

U.S. PATENT DOCUMENTS

| | | | |
|---|---|---|---|
| 7,255,806 B2 * | 8/2007 | Yoshimura et al. | 216/65 |
| 7,339,758 B2 * | 3/2008 | Shimizu et al. | 359/896 |
| 7,892,443 B2 * | 2/2011 | Shimizu et al. | 216/48 |
| 8,197,926 B2 * | 6/2012 | Shinbo et al. | 428/178 |
| 2004/0211753 A1 * | 10/2004 | Shimizu et al. | 216/26 |
| 2010/0092734 A1 * | 4/2010 | Shinbo et al. | 428/178 |
| 2010/0157424 A1 * | 6/2010 | Katsuma et al. | 359/455 |
| 2011/0194178 A1 * | 8/2011 | Katsuma et al. | 359/459 |
| 2012/0229895 A1 * | 9/2012 | Shinbo et al. | 359/448 |

FOREIGN PATENT DOCUMENTS

| | | |
|---|---|---|
| JP | 2009-015195 | 1/2009 |
| JP | 2011-048140 | 3/2011 |
| JP | 2011-048140 | * 10/2011 |

* cited by examiner

*Primary Examiner* — Clayton E Laballe
*Assistant Examiner* — Kevin Butler
(74) *Attorney, Agent, or Firm* — Workman Nydegger (57) ABSTRACT

A screen has an incidence plane that reflects a projected light, and, on the incidence plane, a plurality of lens elements are arranged. The plurality of lens elements have quarter-spherical surfaces, and the spherical surfaces are formed so as to face a light source of the projected light. In a portion of the spherical surface, the portion onto which the projected light is projected, a reflecting section that reflects the projected light is formed. This makes it possible to increase the area of the reflecting sections in the incidence plane and thereby increase the brightness of the screen.

1 Claim, 6 Drawing Sheets

SCREEN AND METHOD FOR PRODUCING FORMING MOLD

BACKGROUND

1. Technical Field

The present invention relates to screens and methods for producing a forming mold for forming a screen.

2. Related Art

In the past, a screen that reflects an image (a projected light) projected from a projector to an observer located in front of the projector and thereby displays the image has been known. As such a screen, a screen reflecting a projected light that is obliquely incident on the screen from below to the front has been known (see, for example, JP-A-2009-15195 (Patent Document 1)).

The screen described in Patent Document 1 has a plurality of fine concave portions or convex portions having hemispherical surfaces, the fine concave portions or convex portions disposed in the vertical and horizontal directions of a viewing screen on which a projected light is incident. Of these portions, in the concave portion, a reflecting coating is formed in a region in a spherical surface of the concave portion, the region distant from a position in which the projector is installed, and the incident light is reflected by the reflecting coating in the direction of the normal of an incidence plane. As a result, an observer located in a viewing position set in the normal direction visually recognizes the projected light, that is, the image.

However, although the screen described in Patent Document 1 increases the area of the region of the viewing screen in which the reflecting coating is formed by densely disposing the concave portions in the viewing screen, the brightness thereof is still insufficient.

For this reason, there has been a demand for a structure of a screen that can further increase the brightness.

SUMMARY

An advantage of some aspects of the invention is to provide a screen that increases the brightness and a method for producing a forming mold for forming the screen.

An aspect of the invention is directed to a screen having an incidence plane on which a light is incident, wherein, on the incidence plane, a plurality of concave lens elements are arranged in a predetermined direction, each lens element has a quarter-spherical surface facing a position from which the light emerges, and, in an area in the spherical surface, the area on which the light is incident, a reflecting section that reflects the light in a predetermined direction is provided.

Here, the quarter-spherical surface includes not only a spherical surface of a quarter of a sphere but also a surface which is closely analogous to the spherical surface of a quarter of a sphere.

For example, in a quarter of a sphere, the intersecting angle of two surfaces (two surfaces which are located next to each other and are not spherical surfaces) is 90 degrees. However, the quarter-spherical surface also includes a nearly quarter-spherical surface in which the intersecting angle of two surfaces is set so as to be 80 degrees or more but 100 degrees or less, for example. Moreover, in a quarter of a sphere, two cross-sections are semicircular. However, the quarter-spherical surface also includes a nearly quarter-spherical surface in which the cross-section is formed so as be a fan shape with a central angle set at 120 degrees or more but 240 degrees or less, for example.

Here, in the screen described in Patent Document 1 mentioned earlier, on the spherical surface, the position of the reflecting coating (the reflecting section) formed in the concave portions (the lens elements) having hemispherical surfaces, the concave portions arranged on the viewing screen, is away from a position from which the light emerges as described earlier. Specifically, when the position from which the light emerges is located below the screen in front thereof, the position in which the reflecting coating is formed is an upper curved surface portion of the spherical surface. In addition, a portion of the concave portion, the portion in which no reflecting coating is formed, does not contribute to light reflection.

On the other hand, in the aspect of the invention, a plurality of concave lens elements having quarter-spherical surfaces are arranged on the incidence plane of the screen. With this configuration, when the quarter-spherical surface is formed so as to have the same radius as that of the existing hemispherical surface, it is possible to reduce the area of each lens element when the incidence plane of the screen is viewed from the front than that of the existing lens element. Therefore, as compared to a case in which the lens elements having semispherical curved surfaces are arranged on the incidence plane, it is possible to increase the number of lines of lens elements. This makes it possible to increase the proportion of the area of the reflecting sections to the area of the incidence plane as compared to the existing screen and increase the brightness of the screen.

Furthermore, according to the aspect of the invention, each lens element is disposed in such a way that the spherical surface of the lens element faces the position from which the light emerges. As a result, each lens element can make the light that has emerged from that position appropriately enter the reflecting section provided on the spherical surface and cause the light that has entered the reflecting section to be reflected efficiently in a predetermined direction.

In the aspect of the invention, it is preferable that a screen base material having the incidence plane be provided, and the screen base material be formed of a black material.

Here, in an existing lens element having a hemispherical surface, a configuration in which a light-absorbing layer is formed in an area other than an area in which a reflecting section is formed and the light-absorbing layer is made to absorb a light (excess light, for example, the outside light) different from the light that is to be reflected by the lens element in a predetermined direction, whereby the light different from the light that is to be reflected by the lens element is prevented from being reflected in the predetermined direction has been proposed. However, as compared to the lens element described above, in a lens element having a quarter-spherical surface, since the lens element has a smaller area of an opening, it is difficult to form the light-absorbing layer in an area other than an area in which a reflecting section is formed.

On the other hand, according to the above configuration, it is possible to make the screen base material itself absorb a light incident on the incidence plane, the light different from the light that is to be reflected by the lens element, and thereby prevent the light different from the light that is to be reflected by the lens element from being emerged in the predetermined direction. As a result, when a light that forms an image is incident on the incidence plane, it is possible to prevent contrast of the image from being reduced by the light different from the light that is to be reflected by the lens element. Furthermore, since it is possible to avoid the trouble of forming the light-absorbing layer on the incidence plane, it is possible to prevent the production process of the screen from becoming complicated.

In the aspect of the invention, it is preferable that the lens elements be disposed so as to lie next to each other.

According to this configuration, since the lens elements are densely disposed on the incidence plane, the proportion of the area of the reflecting sections to the area of the incidence plane can be further increased, whereby the brightness of the screen can be further increased.

Another aspect of the invention is directed to a method for producing a forming mold for forming a screen that reflects an incident light, the method performing: a groove forming process in which a plurality of grooves are formed in an original sheet; a mask layer forming process in which a mask layer is formed on the surface of the original sheet in which the plurality of grooves are formed and in the plurality of grooves; an opening forming process in which openings from which the original sheet is exposed are formed in the mask layer near the grooves; a spherical surface forming process in which an etchant is made to penetrate the original sheet through the openings and the original sheet is etched by the etchant, whereby spherical surfaces, each being quarter-spherical in cross section with the groove in a thickness direction of the original sheet, are formed in the original sheet; a removing process in which the mask layer and the etchant are removed from the original sheet; and a forming mold producing process in which a forming mold having convex spherical surfaces corresponding to the spherical surfaces formed in the original sheet is formed by transferring the surface shape of the original sheet.

According to the aspect of the invention, in the groove forming process, grooves, each forming part of the quarter-spherical surface, are formed, and, in the mask layer forming process, the mask layer is formed in the grooves and on the surface of the original sheet. Then, in the opening forming process, the openings are formed in the mask layer near the grooves, and, in the spherical surface forming process, an etchant is injected through the openings and etching is performed. In the spherical surface forming process, with the surface shape of the original sheet exposed from the openings being maintained, an area located below the openings is eroded downward and the original sheet is eroded in such a way that the eroded region spreads from the edge of the above area to the outside in the shape of a concave curved surface. At this time, while erosion of the original sheet located on the side opposite to the positions in which the grooves are formed continues without stopping, erosion of the original sheet located on the side where the grooves are formed continues downward along the mask layer formed in the grooves. Then, by removing the mask layer and the etchant from the original sheet in the removing procedure, the quarter-spherical surfaces, that is, the spherical surfaces corresponding to the lens elements of the screen described above can be formed in the original sheet. By using the original sheet in which the spherical surfaces described above are formed, it is possible to produce a forming mold for forming the screen described above.

Incidentally, by performing a transferring process in which the spherical surfaces are transferred to the screen base material by using the forming mold produced by the method for producing a forming mold according to the other aspect of the invention and a reflecting section forming process in which a reflecting section that reflects a light in a predetermined direction in an area on which the light is incident, the area in the spherical surfaces transferred to the screen base material, it is possible to produce the screen having the effects described above easily in large quantities.

BRIEF DESCRIPTION OF THE DRAWINGS

The invention will be described with reference to the accompanying drawings, wherein like numbers reference like elements.

DESCRIPTION OF EXEMPLARY EMBODIMENTS

Overall Configuration of a Screen

Hereinafter, an embodiment of the invention will be described based on the drawings.

Figure 1:
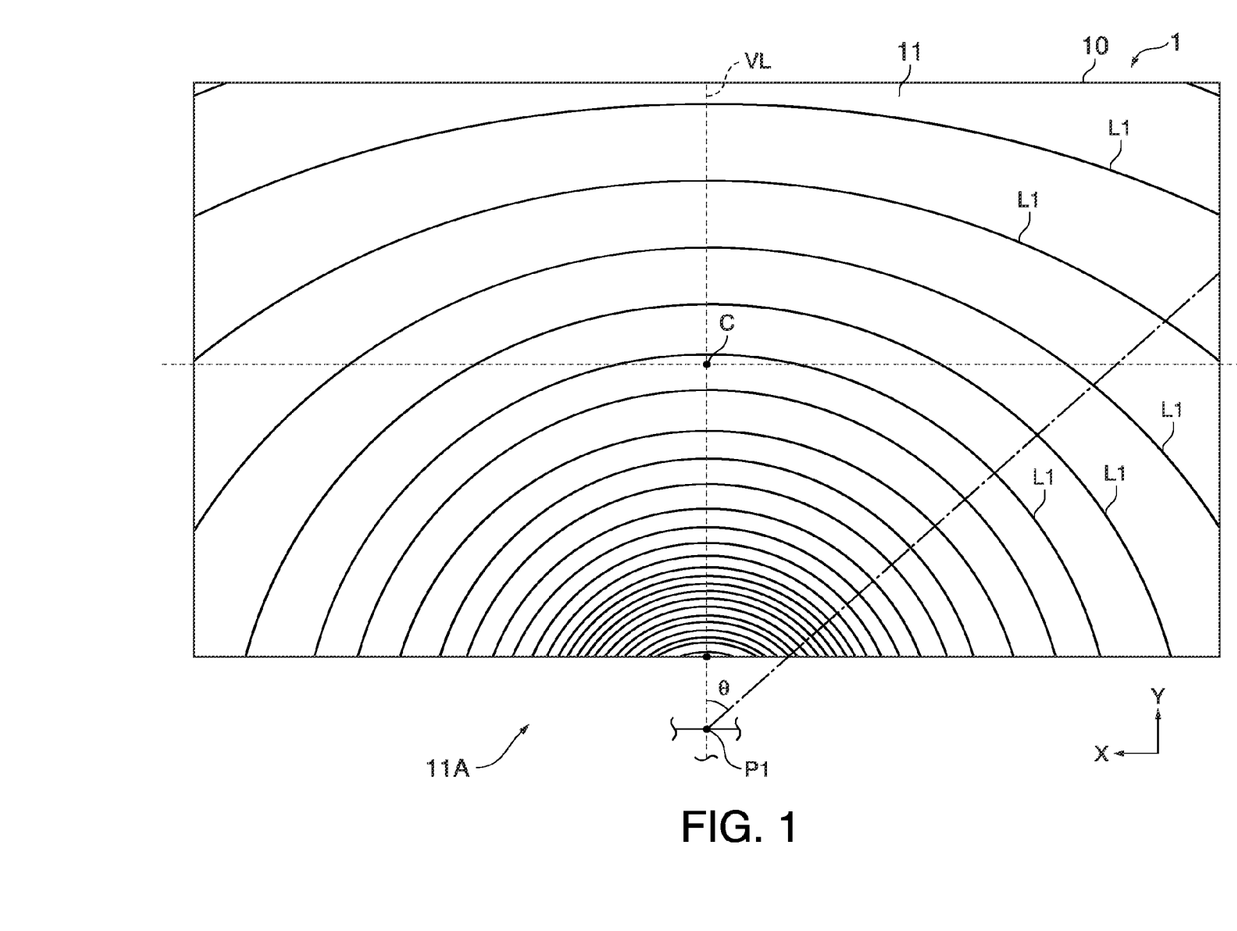
FIG. 1 is a front view showing a screen according to an embodiment of the invention.

FIG. 1 is a front view showing a screen 1 according to the embodiment.

The screen 1 according to the embodiment reflects a light that is obliquely incident on an incidence plane 11 from a projector (not shown) located below on the front side in the direction of the normal of the incidence plane 11 and displays an image (an image formed by the light) that is visually recognized in a viewing position set in the normal direction.

As shown in FIG. 1, the screen 1 includes a screen base material 10 that is formed so as to have a virtually rectangular shape in a front view, and the front side of the screen base material 10 is the incidence plane 11 on which the light from the projector is incident.

In this embodiment, the screen base material 10 is formed of a black material, and an example of the black material is a black resin sheet whose entire portion is black-colored by dyeing, the combination of colorants, or the like. As described above, by using the screen base material 10 formed of a black material, the screen base material 10 itself can absorb the light (for example, the outside light) other than the light incident from the projector.

On the incidence plane 11, a plurality of virtual arc-shaped reference lines (not shown) forming part of concentric circles (including a perfect circle and an ellipse) with a reference point P1 at the center thereof, the reference point P1 which is previously set on an extended plane 11A of the incidence plane 11, are set, and a plurality of lens elements 21 are arranged along the reference lines. As a result, a plurality of lens lines L1 along the reference lines, the lens lines L1 formed of the plurality of lens elements 21, are provided on the incidence plane 11.

Incidentally, in FIG. 1, representative lens lines L1 of the lens lines L1 are shown. However, the lens lines L1 are actually formed so as to be closer to one another. Moreover, some of the reference characters of the lens lines L1 shown in FIG. 1 are omitted. Furthermore, in this embodiment, the reference point P1 is set on a central line VL that is a virtual straight line in a vertical direction, the virtual straight line passing through a center point C of the incidence plane 11.

Configuration of a Lens Element

Figure 2:
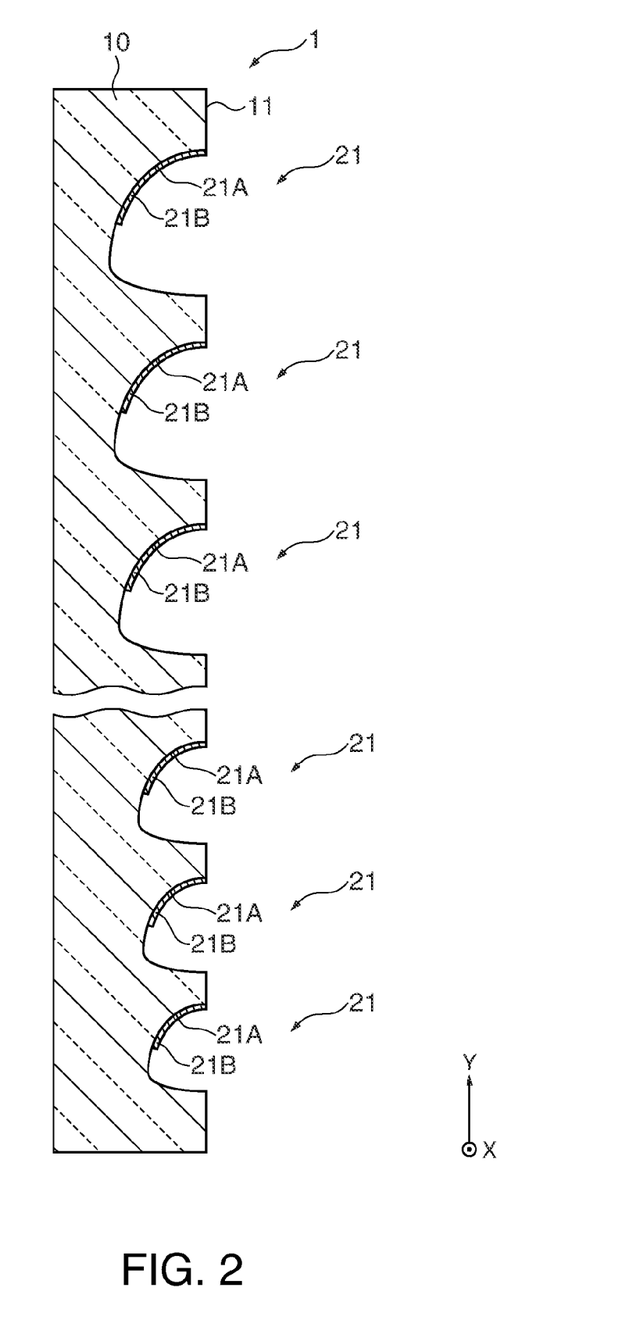
FIG. 2 is a longitudinal sectional view of the screen according to the embodiment.
Figure 3:
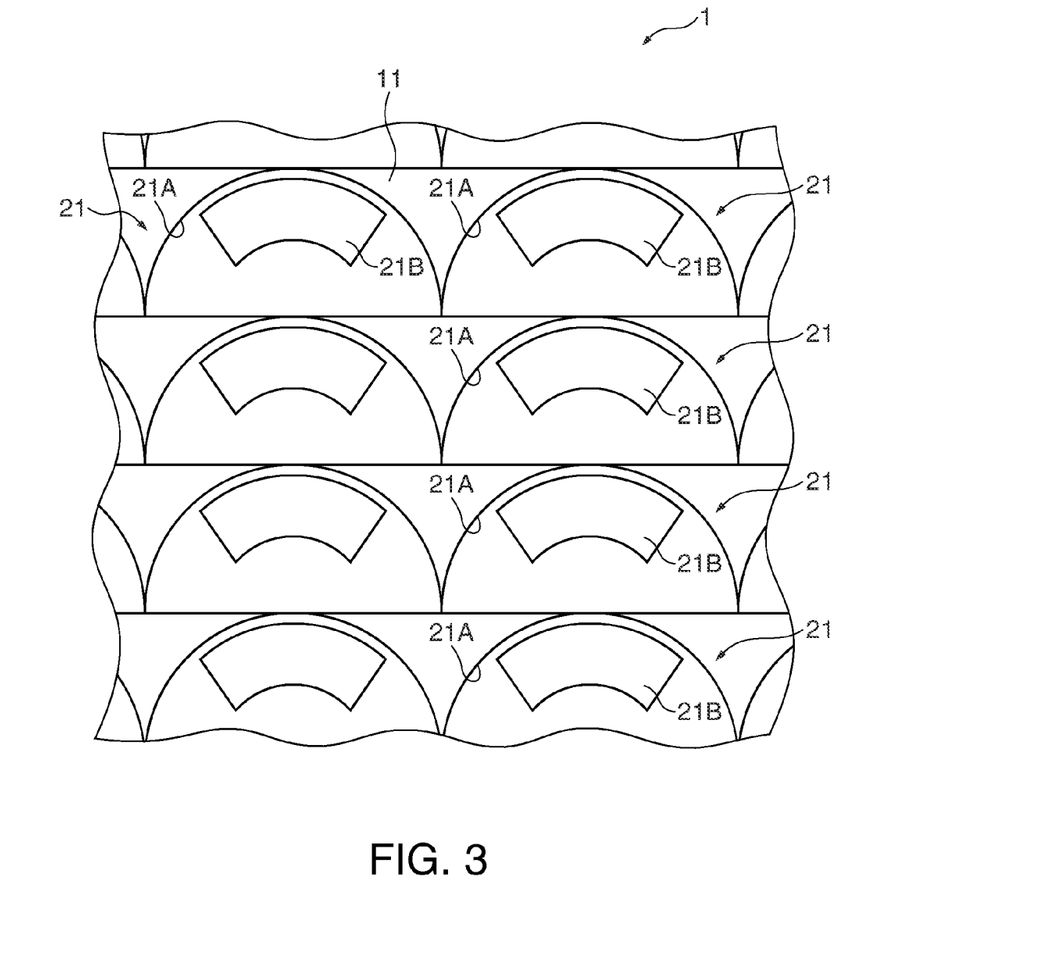
FIG. 3 is an enlarged front view showing part of the screen, the part which is enlarged, of the embodiment.

FIG. 2 is a longitudinal sectional view of the screen 1 in the direction of radiation from the reference point P1, and FIG. 3 is a partially enlarged diagram showing part of the incidence plane 11, the part which is enlarged.

Each lens element 21 functions as a lens that reflects the light incident from the projector in the normal direction. Such a lens element 21 has a quarter-spherical surface 21A. As a result, when the lens element 21 is shown in section in the direction of radiation from the reference point P1, the lens element 21 is shown as a quarter circle; when the lens element 21 is viewed from the front side, the lens element 21 is shown as a semicircle.

Such a spherical surface 21A is disposed so as to face a position from which the light emerges (for example, a position in which the projector is to be installed, the position set in designing the screen). In other words, each lens element 21 is formed in such a way that the spherical surface 21A thereof faces the position from which the light emerges. As a result, the spherical surface 21A is located on the upper side in the lens element 21 so as to face the position from which the light emerges.

In such a spherical surface 21A, a reflecting section 21B is formed. Specifically, the reflecting section 21B is formed in an area in the spherical surface 21A, the area including a region (an effective reflecting region) that can reflect the incident light in the direction of the normal of the incidence plane 11. Such a reflecting section 21B is formed by applying white paint with high reflectivity to the region by using a spray etc. or evaporating aluminum (Al) or silver (Ag) onto the region from an oblique direction.

The lens elements 21 described above are formed in such a way that the size of the lens element 21 in the direction of the normal from the reference point P1 is increased with distance from the reference point P1. In this embodiment, the radii of the lens elements 21 are set at 20 μm or more but 200 μm or less.

Moreover, as shown in FIG. 3, the lens elements 21 are densely formed so as to be contiguous with one another. As a result of the lens elements 21 having the quarter-spherical surfaces 21A being arranged in this manner, as compared to an existing screen in which lens elements having semispherical surfaces are arranged, it is possible to dispose the lens elements 21 more densely on the incidence plane 11. This makes it possible to increase the proportion of the area of the reflecting sections 21B (specifically, the area of the effective reflecting regions) to the area of the incidence plane 11 and increase the brightness of the screen 1 as compared to the existing screen.

Arrangement of Lens Elements

Here, the arrangement of the lens elements 21 will be described in detail.

In the lens lines L1, the spacing (hereinafter also referred to as the "vertical pitch") between the two lines lying next to each other in the direction of radiation from the reference point P1 is increased with distance from the reference point P1. Therefore, in the lens lines L1, the spacing between the two lines lying next to each other, the two lines distant from the reference point P1, is greater than the spacing between the two lines lying next to each other, the two lines close to the reference point P1.

Moreover, in the lens lines L1, the greater the angle θ which the central line VL which is a virtual straight line connecting the reference point P1 and the center point C of the incidence plane 11 forms with the direction of radiation from the reference point P1, the greater the vertical pitch. As a result, the spacing between the two lines lying next to each other near a corner of the incidence plane 11 where the angle θ is greater is greater than the spacing between the two lines lying next to each other near the central line VL where the angle θ is smaller.

Next, the arrangement of the lens elements 21 on one lens line L1 will be described.

The spacing (the spacing in the direction in which the line extends; hereinafter also referred to as the "transverse pitch") between the lens elements 21 lying next to each other on one lens line L1 is increased with distance from the reference point P1. Therefore, the spacing between the lens elements 21 lying next to each other on the lens line L1 distant from the reference point P1 is greater than the spacing between the lens elements 21 lying next to each other on the lens line L1 close to the reference point P1.

Moreover, the transverse pitch between the lens elements 21 on one lens line L1 becomes maximum in a position where the angle θ which the central line VL forms with the direction of radiation from the reference point P1 becomes 45 degrees, and becomes smaller as the angle becomes smaller than 45 degrees and greater than 45 degrees. Therefore, in a certain lens line L1, the spacing between the lens elements 21 near the central line VL and near a corner of the incidence plane 11 becomes minimum, and the spacing between the lens elements 21 disposed in positions where the angle θ becomes 45 degrees becomes maximum.

Here, the reason why the transverse pitch is increased with distance from the reference point P1 will be described.

As described earlier, when the vertical pitch is increased with increase in angle θ, this produces a difference in the angle which a straight line connecting the reference point P1 and the center of a certain lens element 21 forms with the normal to a tangent to the lens line L1 where the lens element 21 is located. This angle difference is increased with distance from the reference point P1 and is increased with distance from the central line VL. As a result, even when the lens elements 21 are located in positions with the same angle θ, the position of a region in which the incident light is appropriately reflected in the direction of the normal of the incidence plane 11 (the effective reflecting region described earlier) in the lens element 21 formed in a position near the reference point P1 is different from that in the lens element 21 formed in a position distant from the reference point P1.

On the other hand, by increasing the transverse pitch with distance from the reference point P1, it is possible to dispose the lens elements 21 in accordance with a difference in positions of the effective reflecting regions.

Moreover, settings are made such that, in the lens lines L1, the spacing (the transverse pitch) between the two lens elements 21 lying next to each other, the two lens elements 21 formed in positions at which the angle θ becomes 45 degrees, becomes maximum, and the transverse pitch is decreased as the angle θ becomes smaller and greater than 45 degrees.

As is the case with the settings of the transverse pitch described above, this also makes it possible to dispose the lens elements 21 in accordance with a difference in positions of the effective reflecting regions.

Incidentally, the angle θ at which the transverse pitch is maximized may vary depending on the size of the screen 1, the positional relationship with the projector, and the like, and is not limited to 45 degrees as in this embodiment.

Method for Producing a Screen

Next, a method for producing the screen 1 described above will be described.

In this production method, the screen 1 is produced by performing, in this order, an original sheet producing process in which an original sheet is produced, a forming mold producing process in which a forming mold is produced by using the original sheet, and a screen forming process in which a screen is formed by using the forming mold.

Original Sheet Producing Process

FIGS. 4A to 4F are schematic diagrams showing the original sheet producing process, the schematic diagrams each showing the cross-section of an original sheet 5 to be produced in a thickness direction thereof. The cross-section is obtained by viewing the original sheet 5 in a direction corresponding to the longitudinal section of a screen 1 to be formed later.

In the original sheet producing process, a groove forming procedure, a mask layer forming procedure, an opening forming procedure, a spherical surface forming procedure, and a removing procedure are performed.

Groove Forming Procedure

Figure 4A:
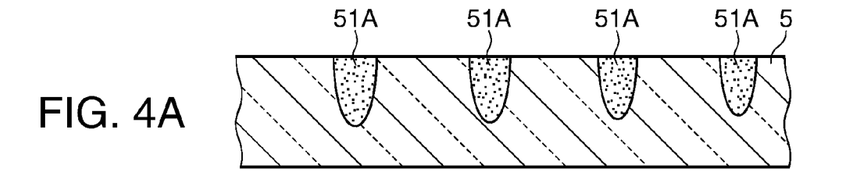
FIG. 4A is a diagram showing an original sheet producing process (a groove forming procedure) in the embodiment.
Figure 4B:
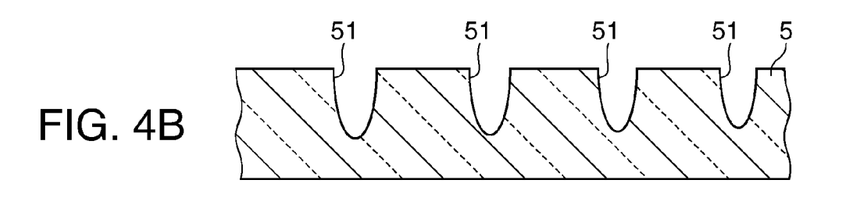
FIG. 4B is a diagram showing the original sheet producing process (the groove forming procedure) in the embodiment.

In the groove forming procedure, as shown in FIGS. 4A and 4B, a plurality of grooves 51 corresponding to portions opposite to the spherical surfaces 21A in the lens elements 21 are formed in the original sheet 5. The grooves 51 are formed in the original sheet 5 in positions in which the lens elements 21 are to be formed. Each groove 51 becomes a part that forms a lens mold 54 later in the spherical surface forming procedure.

Incidentally, as the material of the original sheet 5, glass that contains impurities and can form an affected layer on the surface thereof by irradiation of laser light (for example, YAG laser light) is used. As such glass, for example, glass, such as soda-lime glass, hard glass (except silica glass), and crystal glass, that contains impurities (such as alumina) generating high heat by reacting with the YAG laser light can be used.

First, a predetermined position on the surface of the original sheet 5 is irradiated with laser light, whereby a microcrack layer 51A shown in FIG. 4A is formed.

Then, when the original sheet 5 is immersed in an etchant such as hydrofluoric acid for a predetermined time, the microcrack layer 51A is selectively etched and the grooves 51 are formed.

The size of the groove 51 is appropriately set in accordance with the arrangement etc. of the lens elements 21. For example, the depth of the groove 51 is preferably about 150 μm, and the width (the size along the shorter sides when the groove 51 is viewed in a plan view) of the groove 51 is preferably about 30 to 50 μm.

Mask Layer Forming Procedure

Figure 4C:
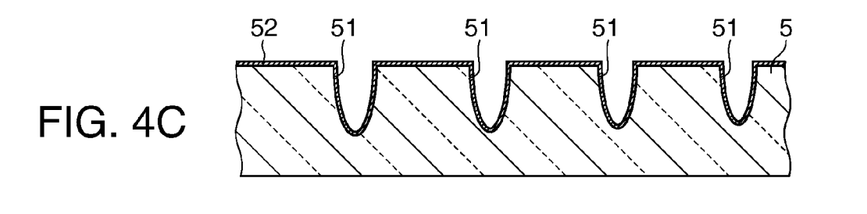
FIG. 4C is a diagram showing an original sheet producing process (a mask layer forming procedure) in the embodiment.

FIG. 4C is a diagram explaining the mask layer forming procedure.

In the mask layer forming procedure, a mask layer 52 is formed on the surface of the original sheet 5 in which the grooves 51 are formed. The mask layer 52 is formed so as to cover not only the surface but also the internal surfaces of the grooves 51.

The mask layer 52 is formed of a material that is not eroded by a liquid (an etchant) that can etch the original sheet 5. In this embodiment, as the mask layer 52, a chromium (Cr) film is formed. As a method for forming the mask layer 52, CVD (chemical vapor deposition) and sputtering are preferable to an evaporation method because CVD and sputtering can form a film also on the internal surfaces of the grooves 51 with no space left thereon.

The thickness of the mask layer 52 is appropriately set in accordance with the material of the mask layer 52. For example, when a chromium film is used, the thickness thereof is preferably about 150 nm.

Figure 4D:
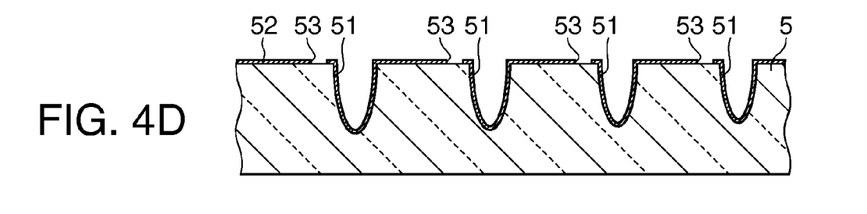
FIG. 4D is a diagram showing an original sheet producing process (an opening forming procedure) in the embodiment.

FIG. 4D is a diagram explaining the opening forming procedure.

In the opening forming procedure, openings 53 are formed in the mask layer 52 near the grooves 51. The openings 53 are provided for impregnating the original sheet 5 with the etchant in the subsequent spherical surface forming procedure. The positions of the openings 53 correspond to positions in which lens molds 54 corresponding to the lens elements 21 are formed. The shape of the opening 53 may be a circle, an ellipse, a polygon, and the like, and is not limited to a particular shape. When the opening 53 is a circle, for example, the size of the opening 53 is preferably about a few micrometers.

Incidentally, the openings 53 can be formed by not only laser irradiation of the mask layer 52 but also photo-etching or the like.

Spherical Surface Forming Procedure

Figure 4E:
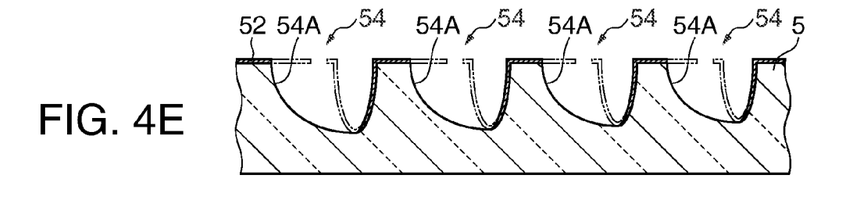
FIG. 4E is a diagram showing an original sheet producing process (a spherical surface forming procedure) in the embodiment.

FIG. 4E is a diagram explaining the spherical surface forming procedure.

In the spherical surface forming procedure, the original sheet 5 is immersed in the etchant for a predetermined time. As a result, the original sheet 5 is etched by the etchant entering the original sheet 5 through the openings 53, whereby the lens molds 54 having quarter-spherical surfaces 54A and corresponding to the lens elements 21 described earlier are formed.

The formation of the lens molds 54 will be described specifically below.

The etchant penetrating the original sheet 5 through the openings 53 gradually etches the original sheet 5. At this time, etching that proceeds to the side where the grooves 51 are located reaches the mask layer 52 formed in the grooves 51, and the progress of etching is retarded by the mask layer 52. The mask layer 52 formed in the grooves 51 functions as a film that retards the progress of etching (an etching retarding film). For example, in FIG. 4E, etching that proceeds to the right is retarded.

On the other hand, etching that proceeds in a direction which is different from the direction in which the grooves 51 are located is not retarded by the mask layer 52 and keeps proceeding. As a result, for example, in FIG. 4E, etching proceeds to the left or downward.

Here, if the mask layer 52 is not formed in the grooves 51, hemispherical surfaces are formed in the original sheet 5 by etching. On the other hand, in this embodiment, the mask layer 52 formed in the grooves 51 retards the progress of etching. That is, since a portion corresponding to almost half of the hemispherical surface is not etched, a portion corresponding to a quarter of a sphere that is almost half of the hemispherical surface is etched. As a result, the lens molds 54 having the quarter-spherical surfaces 54A can be formed in the original sheet 5.

Incidentally, in FIG. 4E, what is indicated by chain double-dashed lines is a portion of the mask layer 52, the portion that is removed as a result of part of the original sheet 5 being etched.

In addition, in this embodiment, since the original sheet 5 made of soda-lime glass is used, an aqueous solution in which the content of ammonium bifluoride is 4 percent by mass, the content of sulfuric acid is 3 percent by mass, and the content of acetic acid is 3 percent by mass is preferable as an etchant for performing etching efficiently. Furthermore, in this embodiment, the temperature of the etchant is set at 25° C. and the time during which etching is performed is set at about 12 hours.

Figure 4F:
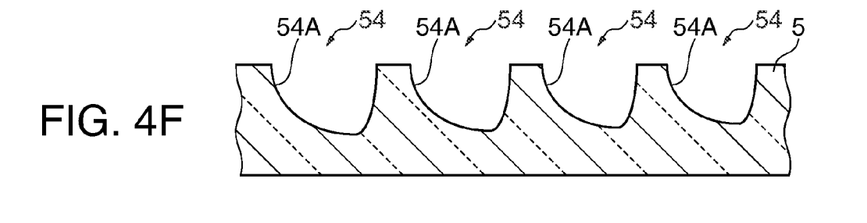
FIG. 4F is a diagram showing an original sheet producing process (a removing procedure) in the embodiment.

FIG. 4F is a diagram explaining the removing procedure.

In the removing procedure, after the formation of the lens molds 54, the mask layer 52 and the etchant that are left on the original sheet 5 are removed. The removal of the mask layer 52 is performed by using a remover. As the remover, an aqueous solution in which the content of cerium ammonium nitrate is 10 percent by mass and the content of perchloric acid is 10 percent by mass is preferable. As another removing method, dry etching using chlorine gas is also preferable.

Furthermore, in the removing procedure, the remover which is left on the original sheet 5 is also removed.

Through these procedures, the original sheet 5 is produced.

The original sheet 5 produced by the original sheet producing process described above corresponds to a forming mold according to the invention. As shown in FIG. 4F, in the original sheet 5, the lens molds 54 having the quarter-spherical surfaces 54A corresponding to the shape of the lens elements 21 of the screen 1 to be produced are formed.

Forming Mold Producing Process

Next, the forming mold producing process will be described.

Figure 5A:
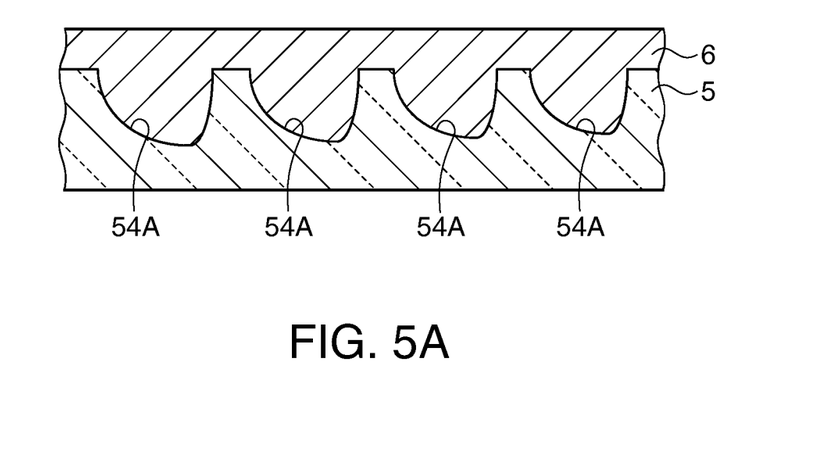
FIG. 5A is a diagram showing a forming mold producing process (a mold forming procedure) in the embodiment.
Figure 5B:
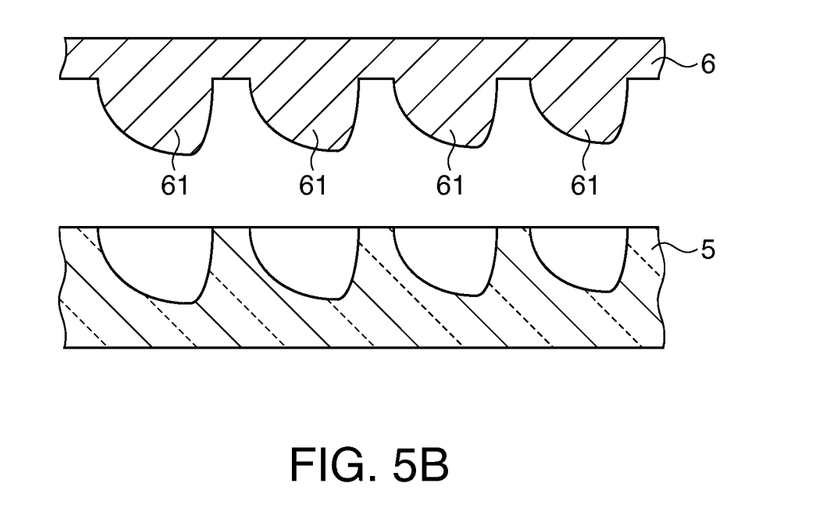
FIG. 5B is a diagram showing a forming mold producing process (a separating procedure) in the embodiment.

FIGS. 5A and 5B are schematic diagrams showing the forming mold producing process, the schematic diagrams each showing the cross-section of a forming mold 6 to be produced in a thickness direction thereof. The cross-section is obtained by viewing the forming mold 6 in a direction corresponding to the longitudinal section of the screen 1 to be formed later.

In the forming mold producing process, a mold forming procedure and a separating procedure are performed.

Mold Forming Procedure

FIG. 5A is a diagram explaining the mold forming procedure.

In the mold forming procedure, plating is formed on the original sheet 5 produced in the original sheet producing process, whereby the forming mold 6 is formed. Specifically, the mold forming procedure is performed as follows.

In the mold forming procedure, first, after the original sheet 5 is cleaned, the original sheet 5 is immersed in an aqueous solution containing 1 g/l of tin chloride, the aqueous solution in which the content of hydrochloric acid is 1 percent by mass, for a predetermined time. After the original sheet 5 is immersed in the aqueous solution, the original sheet 5 is cleaned with water.

Next, the original sheet 5 is immersed in an aqueous solution containing 1 g/l of palladium chloride, the aqueous solution in which the content of hydrochloric acid is 1 percent by mass, for a predetermined time. After the original sheet 5 is immersed in the aqueous solution, the original sheet 5 is cleaned with water.

Next, electroless plating processing is performed on the original sheet 5. In the electroless plating processing, the original sheet 5 is immersed in a commercial electroless nickel plating solution for a predetermined time, whereby an electroless nickel plating film is formed on the surface of the original sheet 5. The thickness of the electroless nickel plating film is about 0.1 μm.

Then, electrolytic plating processing is performed on the original sheet 5. In the electrolytic plating processing, the original sheet 5 on which the electroless nickel plating film is formed is immersed in a nickel sulfamate plating solution and electric current is passed therethrough for a predetermined time, whereby a nickel plating film is formed on the electroless nickel plating film. The thickness of the nickel plating film is about 0.5 mm.

Separating Procedure

FIG. 5B is a diagram explaining the separating procedure.

In the separating procedure, the forming mold 6 is separated from the original sheet 5. In the forming mold 6, convex lens molds 61 corresponding to the shapes of the concave lens molds 54 of the original sheet 5 are formed.

Screen Forming Process

Next, a screen forming process will be described.

Transferring Procedure

In the screen forming process, a transferring procedure is first performed. In the transferring procedure, by pressing the surface shape (the shape of the surface on which the lens molds 61 are formed) of the forming mold 6 against the surface of the screen base material 10, the lens elements 21, each having a concave shape corresponding to the lens mold 54, are formed in the screen base material 10. That is, the shape of the concave lens mold 54 formed in the original sheet 5 is transferred to the screen base material 10 via the forming mold 6 as a lens element 21.

In this embodiment, as a material of the screen base material 10, a black polyvinyl chloride (PVC) sheet is used. The screen base material 10 and the forming mold 6 are heated to 150° C., and the forming mold 6 is pressed against the screen base material 10 for a predetermined time. Then, the screen base material 10 is separated from the forming mold 6 and is cut so as to have a predetermined size.

Reflecting Section Forming Procedure

Next, a reflecting section forming procedure is performed. In the reflecting section forming procedure, the reflecting section 21B is formed on the internal surface of each lens element 21 formed in the screen base material 10. As described earlier, the reflecting section 21B is formed in an area in each lens element 21, the area including the effective reflecting region. In this embodiment, the material of the reflecting section 21B is aluminum (Al). The reflecting section 21B is formed by evaporating or sputtering aluminum onto the screen base material 10 from an oblique direction. The thickness of the reflecting section 21B is about 1000 angstroms.

In this way, the screen 1 is produced.

Effects of the Embodiment

The screen 1 according to the embodiment described above has the following effects.

On the incidence plane 11 of the screen 1, a plurality of concave lens elements 21 having quarter-spherical surfaces 21A are arranged. As a result, when the quarter-spherical surface 21A is formed so as to have the same radius as that of the existing hemispherical surface, it is possible to reduce the area of each lens element 21 when the incidence plane of the screen 1 is viewed from the front than that of the existing lens element. Therefore, as compared to a case in which the lens elements having semispherical curved surfaces are arranged on the incidence plane, it is possible to increase the number of lines of lens elements 21. This makes it possible to increase the proportion of the area of the reflecting sections 21B to the area of the incidence plane 11 as compared to the existing screen and increase the brightness of the screen 1.

Furthermore, in the screen 1, each lens element 21 is disposed in such a way that the spherical surface 21A of the lens element 21 faces a position from which the light emerges. As a result, each lens element 21 can make the light that has emerged from that position appropriately enter the reflecting section 21B provided on the spherical surface 21A and cause the light that has entered the reflecting section 21B to be reflected efficiently in a predetermined direction.

In the screen 1, the screen base material 10 is a black PVC sheet. Therefore, the screen base material 10 itself can absorb the outside light that is incident on the incidence plane 11, making it possible to prevent the outside light from exiting to the side where the observer is located. As a result, when a light that forms an image is incident on the incidence plane 11, it is possible to prevent contrast of the image from being reduced by the outside light. Furthermore, since it is possible to avoid the trouble of forming, on the incidence plane 11, a light-absorbing layer for absorbing the outside light, it is possible to prevent the production process of the screen 1 from becoming complicated.

With the method for producing a forming mold according to the embodiment, in the groove forming procedure, the grooves 51, each forming part of the quarter-spherical surface of the lens mold 54, are formed, and, in the mask layer forming procedure, the mask layer 52 is formed in the grooves 51 and on the surface of the original sheet 5. Then, in the opening forming procedure, the openings 53 are formed in the mask layer 52 near the grooves 51, and, in the spherical surface forming procedure, an etchant is injected through the openings 53 and etching is performed. In the spherical surface forming procedure, with the surface shape of the original sheet 5 exposed from the openings 53 being maintained, an area located below the openings 53 is eroded downward and the original sheet 5 is eroded in such a way that the eroded region spreads from the edge of the above area to the outside in the shape of a concave curved surface. At this time, while erosion of the original sheet 5 located on the side opposite to the positions in which the grooves 51 are formed continues without stopping, erosion of the original sheet 5 located on the side where the grooves 51 are formed continues downward along the mask layer 52 formed in the grooves 51. Then, by removing the mask layer 52 and the etchant from the original sheet 5 in the removing procedure, the quarter-spherical surfaces 54A, that is, the spherical surfaces 54A corresponding to the lens elements 21 of the screen 1 described above can be formed in the original sheet 5. By using this original sheet 5, it is possible to produce the forming mold 6 for forming the screen 1 in the forming mold producing process.

In the screen forming process according to the embodiment, the spherical surfaces 54A are transferred to the screen base material 10 as the lens elements 21 by the transferring procedure. Then, in the reflecting section forming procedure, the reflecting sections 21B are formed in the effective reflecting regions on the internal surfaces of the lens elements 21. In this way, it is possible to produce the screen 1 having the effects described above easily in large quantities.

Modified Examples of the Embodiment

The invention is not limited to the embodiment described above and various changes and modifications can be made therein without departing from the spirit of the invention.

In the embodiment described above, the reference point P1 is set on the extended plane 11A of the incidence plane 11, but the invention is not limited thereto. That is, a position in which the reference point P1 is set may be located on the incidence plane 11.

Figure 6:
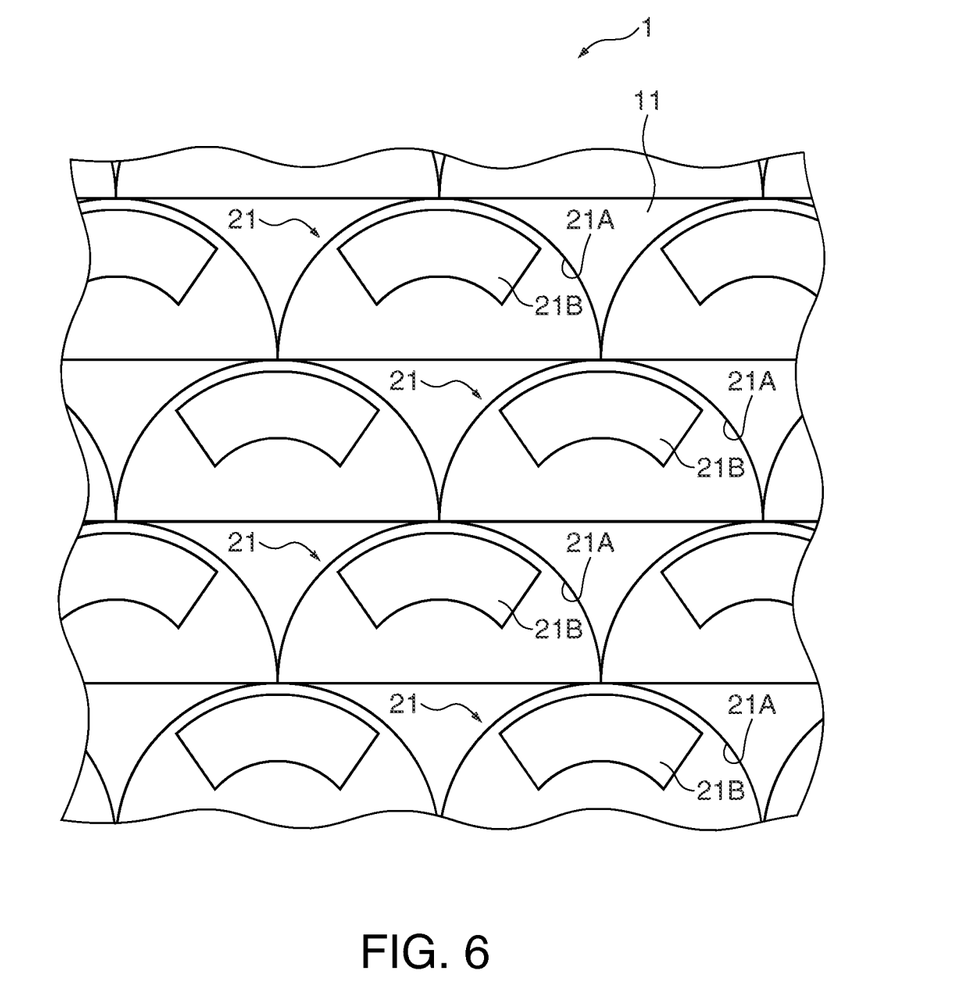
FIG. 6 is an enlarged front view showing part of a screen according to a modified example of the embodiment of the invention, the part which is enlarged.

In the embodiment described above, a plurality of lens elements 21 formed in the incidence plane 11 are two-dimensionally arranged on the incidence plane 11, but the invention is not limited thereto. That is, the arrangement pattern of the lens elements 21 is not limited to that of the embodiment described above. For example, as shown in FIG. 6, the lens elements 21 may be arranged by being alternately displaced laterally by a radius of a sphere. In addition, the lens elements 21 may be arranged in a square grid pattern (in the shape of a lattice of uniform squares), in a staggered arrangement (in the shape of a hexagonal close-packed lattice), or the like.

In the embodiment described above, the lens elements 21 are provided so as to be close to one another from the viewpoint of increasing the reflective area (the area of the reflecting sections 21B) in the incidence plane 11. Instead, from the viewpoint of the viewing angle and the brightness of a screen to be produced and from a production viewpoint etc., a gap may be provided between the lens elements 21 as long as the gap does not reduce the effects of the invention.

In the embodiment described above, the screen 1 is formed by using a black PVC sheet. Instead, to provide the screen 1 with a light absorption property, the screen base material 10 may be formed of a non-black material and the incidence plane 11 may be coated with black paint.

In the embodiment described above, the formation of the grooves 51 is performed by irradiation of laser and wet etching, but the invention is not limited thereto. The method is not limited to a particular method as long as it can form the grooves 51 in predetermined positions of the original sheet 5, and the method can be appropriately chosen in accordance with the base material. For example, the formation of the grooves 51 may be performed by photolithography and dry etching.

In the embodiment described above, a chromium film is used as the mask layer 52, but the invention is not limited thereto. For example, the mask layer 52 may be formed by using a chromium oxide (CrO) film as a primary coating and forming a chromium film thereon by sputtering or the like.

Moreover, before forming the mask layer 52, blasting may be performed on the surface of the original sheet 5 by sand-blasting or the like. By performing blasting on the surface of the original sheet 5, many microscopic asperities are formed on the surface of the original sheet 5, whereby the surface area of the original sheet 5 is increased and the original sheet 5 adheres to the mask layer 52 more tightly.

The method for transferring the shape of the forming mold to the screen base material 10 is not limited to a particular method and is appropriately chosen in accordance with the forming mold and the material etc. of the screen base material 10. In addition to the above-described method using an electroformed mold, a method by which the shape of the forming mold is transferred to the screen base material 10 by 2P method, for example, can be adopted. That is, the screen may be produced by other methods as long as they can form the quarter-spherical lens elements described above.

The invention can be suitably applied to a screen onto which an image is projected.

The entire disclosure of Japanese Patent Application No. 2011-58313, filed Mar. 16, 2011 is expressly incorporated by reference herein.

What is claimed is:

1. A method for producing a forming mold for forming a screen that reflects an incident light, the method performing:

a groove forming process in which a plurality of grooves are formed in an original sheet;

a mask layer forming process in which a mask layer is formed on the surface of the original sheet in which the plurality of grooves are formed and in the plurality of grooves;

an opening forming process in which openings from which the original sheet is exposed are formed in the mask layer near the grooves, which the opening are formed in a location that is different from the location where the grooves are formed;

a spherical surface forming process in which an etchant is made to penetrate the original sheet through the openings and the original sheet is etched by the etchant, whereby spherical surfaces, each being quarter-spherical in cross section with the groove in a thickness direction of the original sheet, are formed in the original sheet;

a removing process in which the mask layer and the etchant are removed from the original sheet; and a forming mold producing process in which a forming mold having convex spherical surfaces corresponding to the spherical surfaces formed in the original sheet is formed by transferring the surface shape of the original sheet.

* * * * *